US012651868B2

(12) United States Patent
Nawa

(10) Patent No.: US 12,651,868 B2
(45) Date of Patent: Jun. 9, 2026

(54) CONNECTOR

(71) Applicant: SUMITOMO WIRING SYSTEMS, LTD., Mie (JP)

(72) Inventor: Tetsuo Nawa, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 296 days.

(21) Appl. No.: 18/282,659

(22) PCT Filed: Mar. 7, 2022

(86) PCT No.: PCT/JP2022/009653

§ 371 (c)(1),
(2) Date: Sep. 18, 2023

(87) PCT Pub. No.: WO2022/202244

PCT Pub. Date: Sep. 29, 2022

(65) Prior Publication Data

US 2024/0170892 A1 May 23, 2024

(30) Foreign Application Priority Data

Mar. 25, 2021 (JP) ................................ 2021-051246

(51) Int. Cl.
*H01R 13/639* (2006.01)
*H01R 13/502* (2006.01)
*H01R 13/641* (2006.01)

(52) U.S. Cl.
CPC ......... *H01R 13/639* (2013.01); *H01R 13/502* (2013.01); *H01R 13/641* (2013.01)

(58) Field of Classification Search
CPC ... H01R 13/639; H01R 13/502; H01R 13/641
(Continued)

(56) References Cited

U.S. PATENT DOCUMENTS 6,045,388 A * 4/2000 Higgins ............. H01R 13/6273 439/352
7,896,683 B1 * 3/2011 Ratzlaff ............... H01R 13/631 439/680
(Continued)

FOREIGN PATENT DOCUMENTS

JP H01-166977 U1 11/1989
JP 2015-005490 A 1/2015
JP 2019-133758 A 8/2019

OTHER PUBLICATIONS

International Search Report issued on May 17, 2022 for WO 2022/202244 A1 (4 pages).

*Primary Examiner* — Gary F Paumen
(74) *Attorney, Agent, or Firm* — Venjuris, P.C.

(57) ABSTRACT

A connector includes a housing configured to mate with a mating housing in a mating direction and a detection member attached to the housing and configured to move between a temporary fastening position and a full fastening position after mating of the housing with the mating housing, the housing including an elastically deformable locking arm having a locking part that fastens onto a lock receiving part provided on the mating housing, the detection member including a position securing engagement part configured to enter a flexural space of the locking arm and restrict flexing of the locking arm when the locking part and the lock receiving part are fastened together, the detection member being arranged to overlap the housing in a stacking direction intersecting the mating direction and protruding rearward in the mating direction from the housing when arranged in the temporary fastening position.

8 Claims, 14 Drawing Sheets

(58) Field of Classification Search
USPC .......................................... 439/352, 489, 680
See application file for complete search history.

(56) References Cited

U.S. PATENT DOCUMENTS

| | | | |
|---|---|---|---|
| 2013/0237083 A1 | 9/2013 | Kon et al. | |
| 2017/0250502 A1 | 8/2017 | Endo et al. | |
| 2020/0153152 A1* | 5/2020 | Mamiya ............ | H01R 13/5202 |

* cited by examiner

CONNECTOR

CROSS REFERENCE TO RELATED APPLICATIONS

This application is a national phase of PCT application No. PCT/JP2022/009653, filed on 7 Mar. 2022, which claims priority from Japanese patent application No. 2021-051246, filed on 25 Mar. 2021, all of which are incorporated herein by reference.

TECHNICAL FIELD

The present disclosure relates to a connector.

BACKGROUND

A conventionally known method for detecting whether a pair of connectors are mated together properly is to attach a detection member to one of the connectors. The detection member is held in an initial position and cannot be operated forward until the pair of connectors are mated together properly, and, once the pair of connectors are mated together properly, forward operation is allowed and the detection member moves to a detection position. JP 2019-133758 A discloses a known example of a connector equipped with a detection member.

PRIOR ART DOCUMENT

Patent Document

Patent Document 1: JP 2019-133758 A

SUMMARY OF THE INVENTION

Problems to be Solved

In order to protect a rear end portion of the detection member held in the initial position, a housing part for housing the detection member is provided protruding rearward from a rear end portion of the connector. This housing part becomes wasted space after the detection member is moved to the detection position.

In view of this, it is conceivable to configure the housing part for housing the detection member to not protrude from the connector, in order to downsize the connector as a whole. However, adopting such a configuration results in the rear end portion of the detection member protruding rearward from the rear end portion of the connector, when the detection member is held in the initial position. If an external force then acts the detection member, such as a foreign object impacting the rear end portion of the detection member, the detection member could possibly flex, detach from the connector, or the like.

The present disclosure has been arrived at based on circumstances such as the above, and an object thereof is to provide a connector that is downsized and is also able to suppress flexing of a detection member, detachment of the detection member from a housing and the like, even if an external force acts on the detection member.

Means to Solve the Problem

A connector according to the present disclosure includes a housing configured to mate with a mating housing in a mating direction, and a detection member attached to the housing and configured to move between a temporary fastening position and a full fastening position after mating of the housing with the mating housing, the housing including an elastically deformable locking arm having a locking part configured to fasten onto a lock receiving part provided on the mating housing, the detection member including a position securing engagement part configured to enter a flexural space of the locking arm and restrict flexing of the locking arm when the locking part and the lock receiving part are fastened together, the detection member being arranged to overlap the housing in a stacking direction intersecting the mating direction and protruding rearward in the mating direction from the housing when arranged in the temporary fastening position, the housing including a cavity housing a terminal, an engagement groove extending in the mating direction being provided in a surface of the housing facing the detection member at a position lateral to the cavity with respect to the mating direction, and the detection member including a protrusion protruding toward the housing and extending in the mating direction and configured to enter the engagement groove.

Effect of the Invention

According to the present disclosure, the connector can be downsized, and flexing of the detection member, detachment of the detection member from the housing and the like can be suppressed, even if an external force acts on the detection member.

DETAILED DESCRIPTION TO EXECUTE THE INVENTION

Description of Embodiments of Present Disclosure

Figure 1:
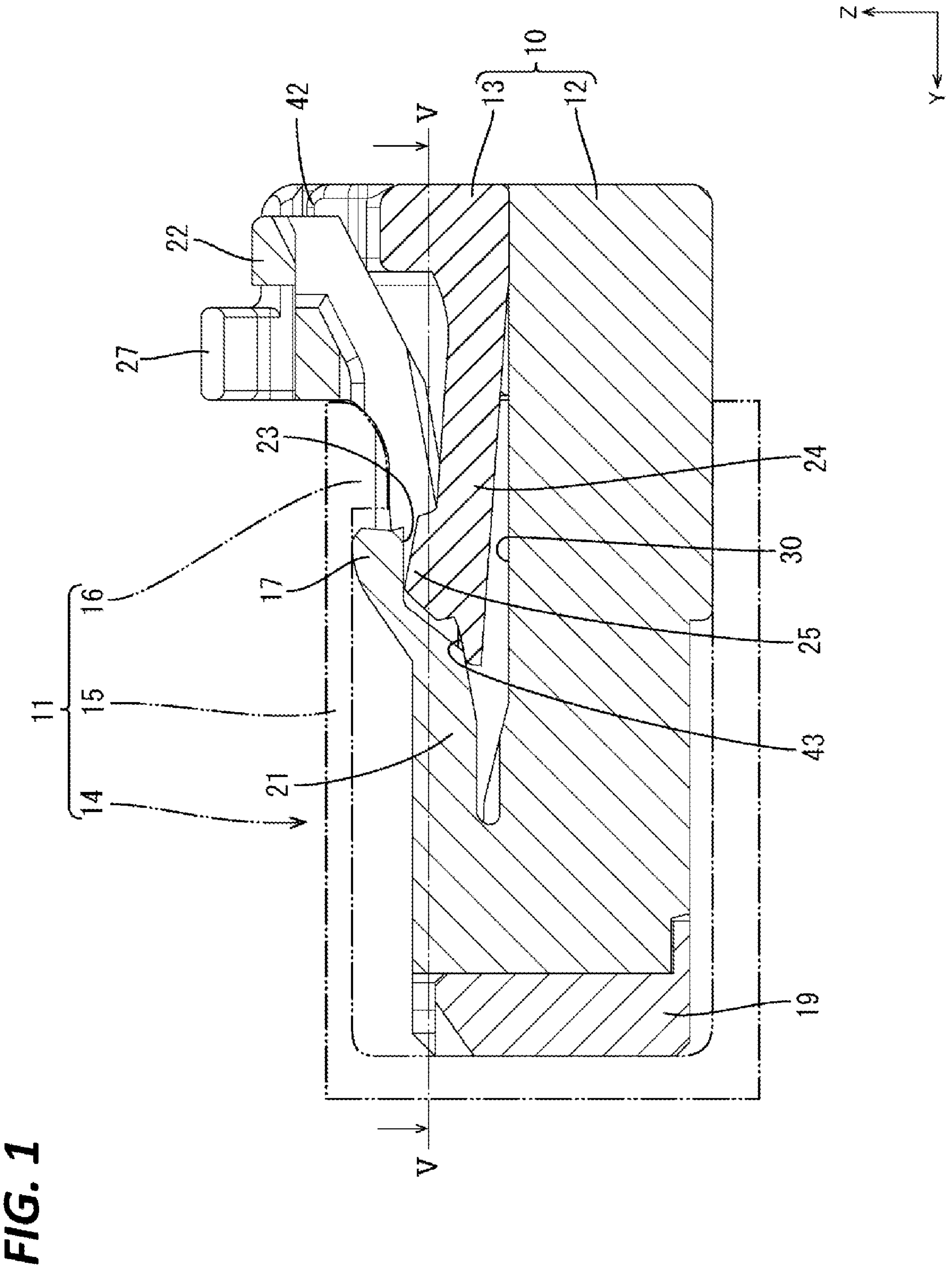
FIG. 1 is a cross-sectional view taken along line I-I in FIG. 3, showing a female connector according to Embodiment 1.

Initially, modes of the present disclosure will be enumerated and described.

(1) A connector according to the present disclosure includes a housing configured to mate with a mating housing in a mating direction, and a detection member attached to the housing and configured to move between a temporary fastening position and a full fastening position after mating of the housing with the mating housing, the housing including an elastically deformable locking arm having a locking part configured to fasten onto a lock receiving part provided on the mating housing, the detection member including a position securing engagement part configured to enter a flexural space of the locking arm and restrict flexing of the locking arm when the locking part and the lock receiving part are fastened together, the detection member being arranged to overlap the housing in a stacking direction intersecting the mating direction, and protruding rearward in the mating direction from the housing when arranged in the temporary fastening position, the housing including a cavity housing a terminal, an engagement groove extending in the mating direction being provided in a surface of the housing facing the detection member at a position lateral to the cavity with respect to the mating direction, and the detection member including a protrusion protruding toward the housing and extending in the mating direction and configured to enter the engagement groove.

The connector can be downsized, compared with the case where an engagement groove is provided between the cavity and the detection member. Even if an external force acts on the detection member in the temporary fastening position, the external force is received by the protrusion and by the housing via the engagement groove, due to the protrusion entering the groove, and thus flexing of the detection member, detachment of the detection member from the housing and the like are suppressed.

(2) Preferably, a width dimension of a bottom surface of the engagement groove is set larger than a width dimension of an opening of the engagement groove, and the protrusion has a cross-sectional shape following a cross-sectional shape of the engagement groove.

The housing and the detection member are firmly held, due to the protrusion entering the engagement groove whose bottom surface is set to a larger width than the opening, and thus flexing of the detection member, detachment of the detection member from the housing and the like are further suppressed.

(3) Preferably, the detection member includes an extension part extending forward in the mating direction, and the protrusion is formed on a surface of the extension part facing the housing, and a front end portion of the protrusion is located rearward of a front end portion of the extension part in the mating direction.

The front end portion of the protrusion is protected by the front end portion of the extension part, and thus impacting of foreign objects with the front end portion of the protrusion can be suppressed.

(4) Preferably, an operating part for an operator to operate the detection member is provided on each of lateral end portions of the detection member with respect to the mating direction, and housing recessed parts configured to house the operating parts when the detection member has moved to the full fastening position are provided at positions of the housing corresponding to the operating parts.

Operation of the detection member is facilitated due to the operating parts being provided. Also, the operating parts are housed in the housing recessed parts, and thus protrusion of the operating parts outside the housing is suppressed when the detection member has moved to the full fastening position. The connector can thereby be downsized as a whole.

(5) Preferably, a standing wall extending upward in the stacking direction from each of lateral end portions of the housing with respect to the mating direction and a protective part provided upward of the locking arm to bridge between distal ends of the standing walls are formed on the housing, and the detection member includes a support part provided at a position downward of the protective part in the stacking direction and configured to abut against the protective part from below when the protective part receives a force from above in the stacking direction.

The protective part is supported from below by the support part, and thus excessive deformation of the protective part is suppressed. The locking arm can thereby be further protected.

(6) Preferably, the housing includes a mating rib protruding laterally on each side thereof with respect to the mating direction and extending in the mating direction, the mating ribs are configured to abut against the mating housing when the housing and the mating housing are mated together in an improper manner, and to allow mating of the housing and the mating housing when the housing and the mating housing are mated together in a proper manner, and the engagement groove is provided in each of the mating ribs.

The engagement grooves are provided in the mating ribs, thus enabling the space of the housing to be utilized effectively. The connector can thereby be downsized as a whole.

Detailed Description of Embodiments of Disclosure

Hereinafter, embodiments of the present disclosure will be described. The present disclosure is not limited to these illustrative examples and is indicated by the claims, and all changes that come within the meaning and range of equivalency of the claims are intended to be embraced therein.

Embodiment 1

Embodiment 1 of the present disclosure will be described with reference to FIGS. 1 to 15. A female connector 10 (example of connector) according to the present embodiment is configured to mate with a male connector 11 (example of mating connector). The female connector 10 includes a female housing 12 (example of housing) and a detection member 13. In the following description, the direction indicated by arrow Z is upward, the direction indicated by arrow Y is forward, and the direction indicated by arrow X is leftward. Note that reference numerals may be given to only some of a plurality of members and not to all of the members.

Male Connector 11

As shown in FIG. 1, the male connector 11 includes a male housing 14 (example of mating housing) formed by injection molding an insulating synthetic resin material. The male housing 14 includes a hood part 15 that is open rearward. The female connector 10 is configured to be fitted inside the hood part 15 from the rear. In the present embodiment, the front-rear direction is the mating direction of the male connector 11 and the female connector 10. A plate-shaped male terminal (not shown) that extends in the front-rear direction is arranged on a front wall of the hood part 15. A rear end portion of the male terminal is located inside the hood part 15.

A lock receiving part 16 that protrudes downward is provided on a rear end portion of an upper wall of the hood part 15. The lock receiving part 16 is configured to abut against a locking part 17 of the female connector 10 described later from the rear. The female connector 10 is restricted from moving rearward, due to the lock receiving part 16 of the male connector 11 abutting against the locking part 17 of the female connector 10 from the rear.

Female Connector 10

Figure 2:
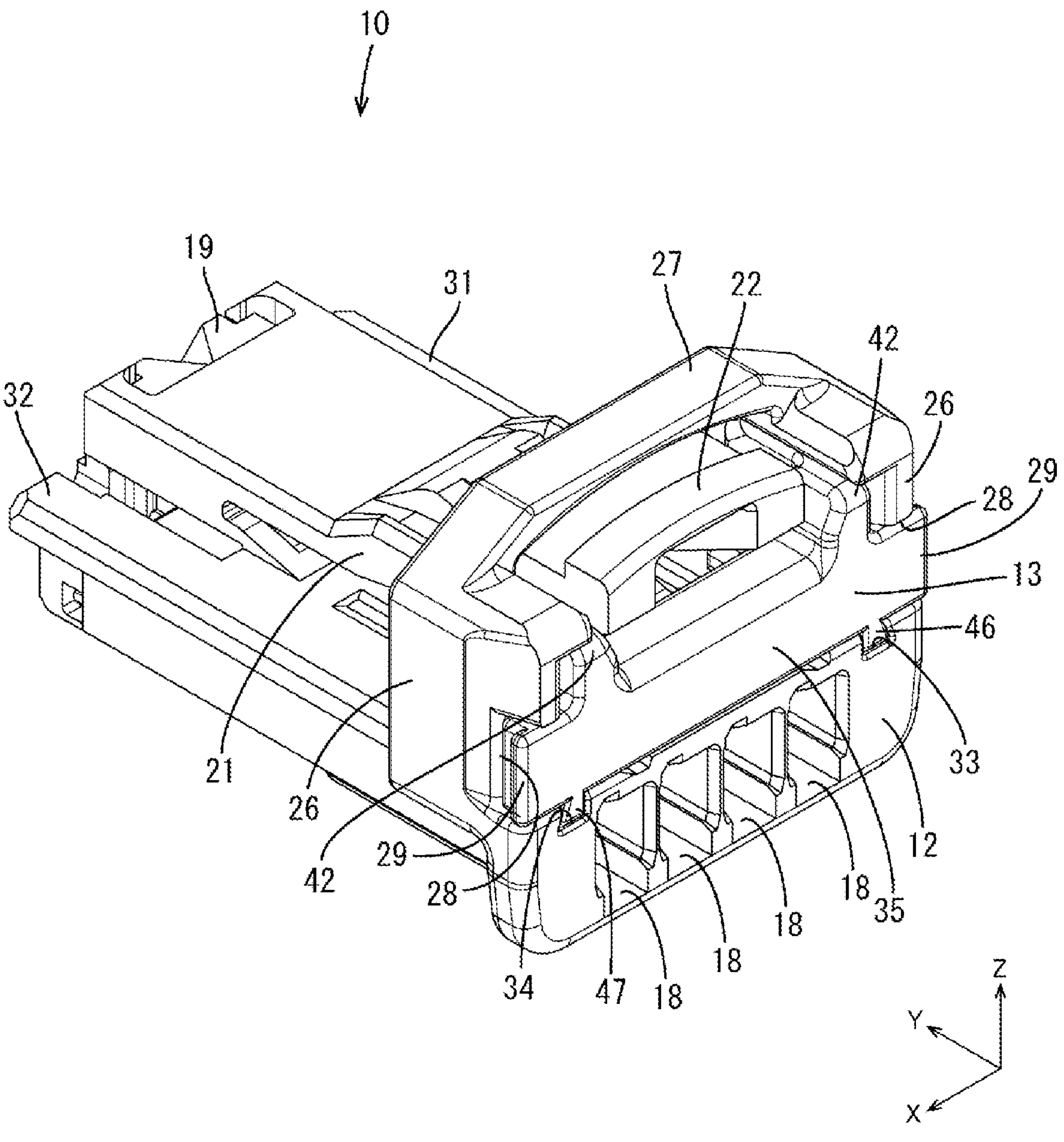
FIG. 2 is a perspective view showing the female connector when a detection member is arranged in a full fastening position.

As shown in FIG. 2, the female connector 10 is provided with the female housing 12 and the detection member 13. In the female housing 12, a plurality of cavities 18 (four in the present embodiment) that pass through in the front-rear direction are formed side by side with intervals therebetween in the left-right direction (example of intersecting direction). A female terminal (not shown) is housed in each cavity 18. A front mask 19 is attached to a front end portion of the female housing 12. Openings 20 that communicate with the cavities 18 of the female housing 12 are formed on a front wall of the front mask 19 to pass through in the front-rear direction (see FIG. 3).

As shown in FIG. 1, a locking arm 21 that extends rearward from the front end portion of the female housing 12 is provided on an upper surface of an upper wall of the female housing 12. The locking part 17 protruding upward is provided on an upper surface of the locking arm 21 near the middle in the front-rear direction. An operating part 22 for an operator to operate the locking arm 21 is formed on a rear end portion of the locking arm 21.

As shown in FIG. 1, an engaging recessed part 23 that is recessed upward is formed on a lower side of the locking part 17. This engaging recessed part 23 and a position securing engagement part 25 of an elastic engagement part 24 of the detection member 13 described later are configured to engage each other. The locking arm 21 is formed to be elastically deformable in the up-down direction with a front end portion thereof as a point of support. For example, the locking arm 21 can be elastically deformed downward, due to the operator pushing the operating part 22 downward.

As shown in FIG. 2, a standing wall 26 that extends upward from each of left and right end portions of the female housing 12 is formed at a position toward a rear end portion of the female housing 12. Upper end portions of the standing walls 26 are coupled together by a protective part 27. The protective part 27 is formed upward of the locking arm 21 to bridge between the upper end portions of the standing walls 26. Interference of the locking arm 21 with foreign objects is suppressed by the standing walls 26 and the protective part 27. The standing walls 26 and the protective part 27 are elastically deformable as a whole.

As shown in FIG. 2, a housing recessed part 28 that is recessed forward is formed at a rear end portion of each standing wall 26. As will be described later, the housing recessed parts 28 are each configured to house an operating part 29 provided on the detection member 13, when the detection member 13 is held in a full fastening position with respect to the female housing 12.

Figure 4:
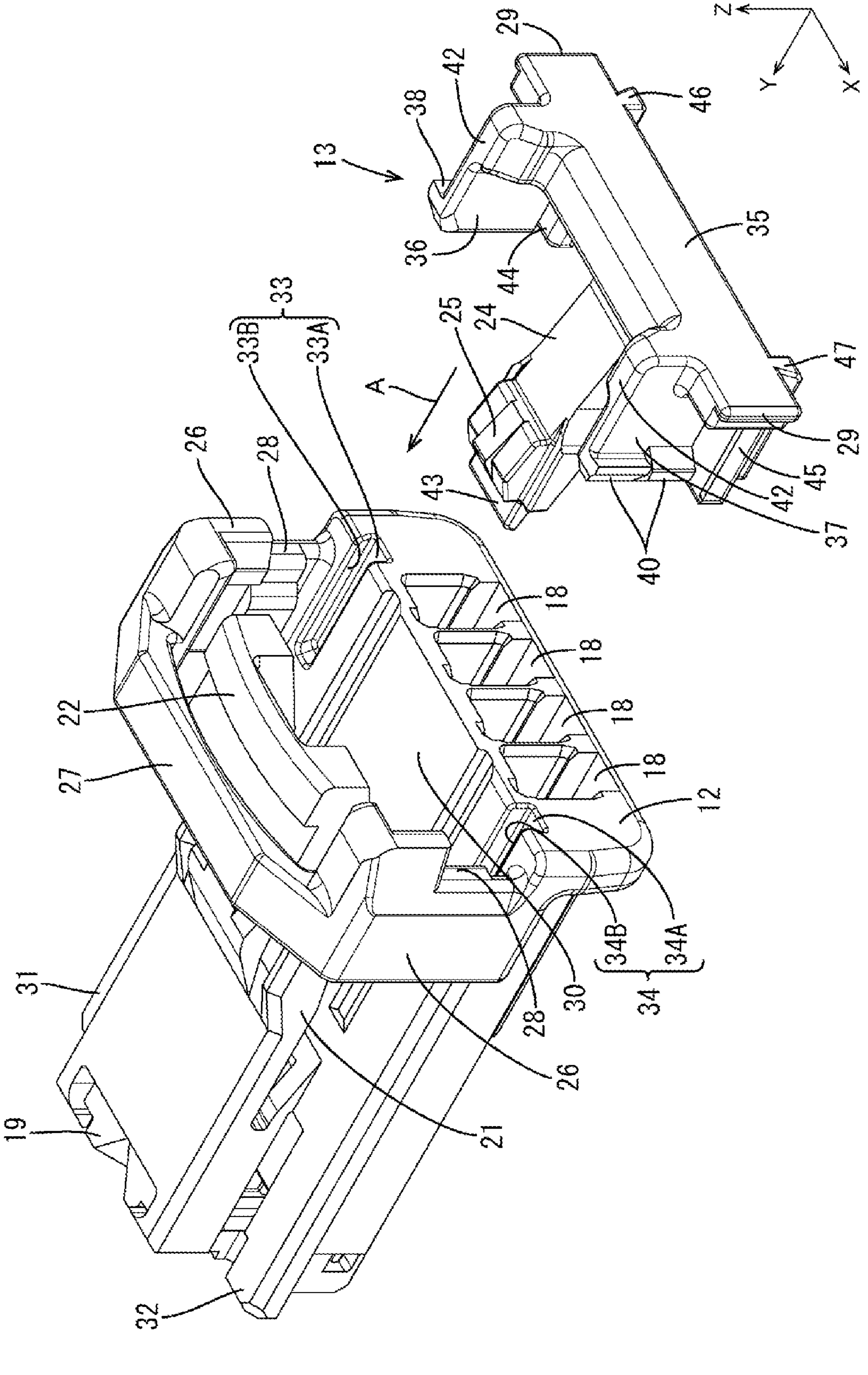
FIG. 4 is a perspective view showing a process in which the female housing and the detection member are assembled.

As shown in FIG. 4, a detection member housing part 30 that is open rearward and is for housing the detection member 13 is formed in the rear end portion of the female housing 12. The detection member 13 is housed inside the detection member housing part 30 in such a manner as to be movable in the front-rear direction. The detection member 13 is arranged to overlap the portion of the female housing 12 where the cavities 18 are formed from above (example of stacking direction).

Figure 5:
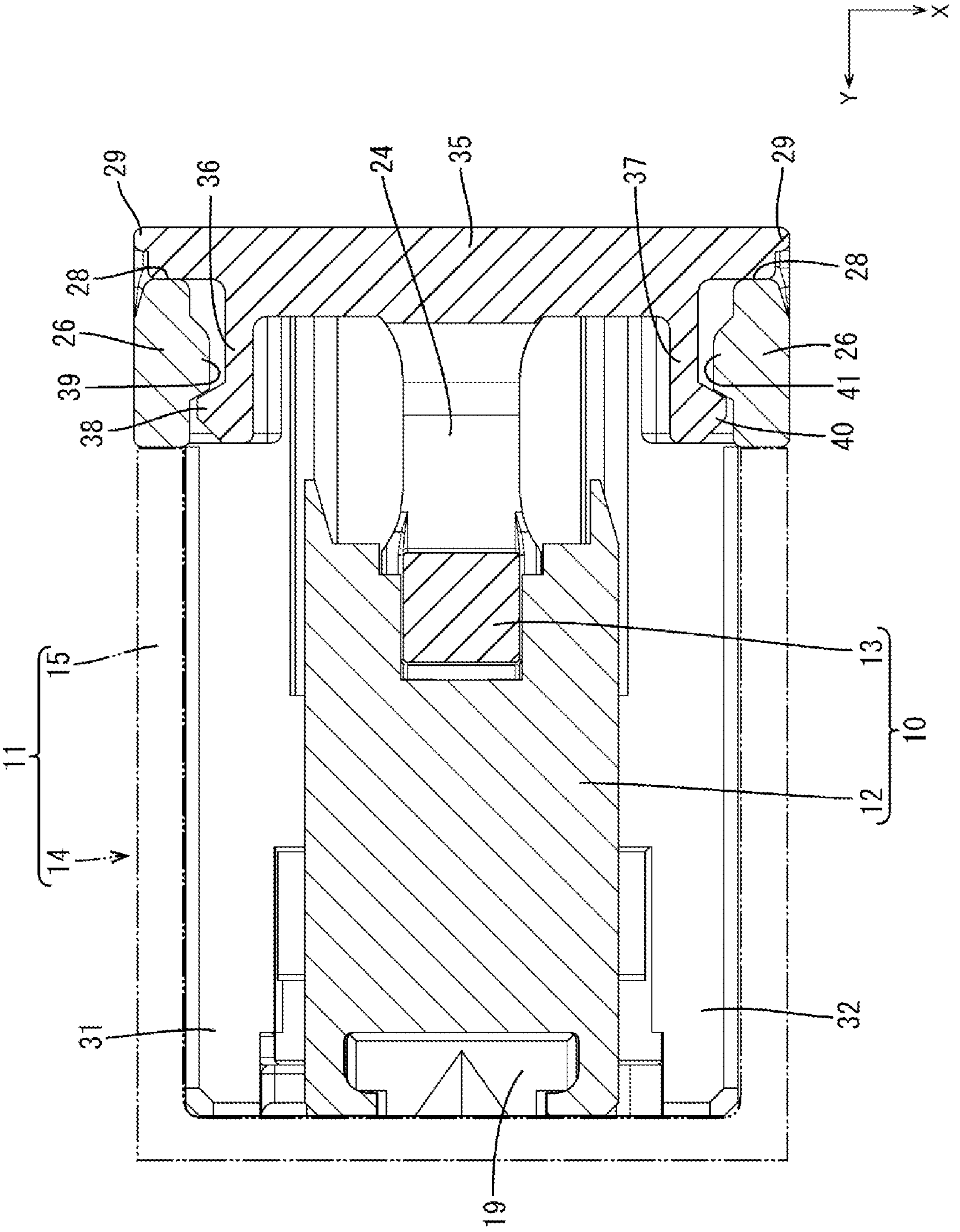
FIG. 5 is a cross-sectional view taken along line V-V in FIG. 1.

As shown in FIG. 5, a right mating rib 31 (example of mating rib) that protrudes rightward and extends in the front-rear direction is formed on a right end portion of the female housing 12. The right mating rib 31 extends to the front end portion of the female housing 12. Also, a left mating rib 32 (example of mating rib) that protrudes leftward and extends in the front-rear direction is formed on a left end portion of the female housing 12. The left mating rib 32 extends to the front end portion of the female housing 12.

As shown in FIG. 5, when the female housing 12 and the male housing 14 are mated together in a proper manner, the right mating rib 31 and the left mating rib 32 are configured to be housed inside the hood part 15 of the male housing 14. On the other hand, although not shown in detail, when the female housing 12 and the male housing 14 are mated together in an improper manner, the right mating rib 31 and the left mating rib 32 will not be housed inside the hood part 15 of the male housing 14 due to abutting against the male housing 14. Improper mating of the female housing 12 and the male housing 14 is thereby suppressed.

Figure 6:
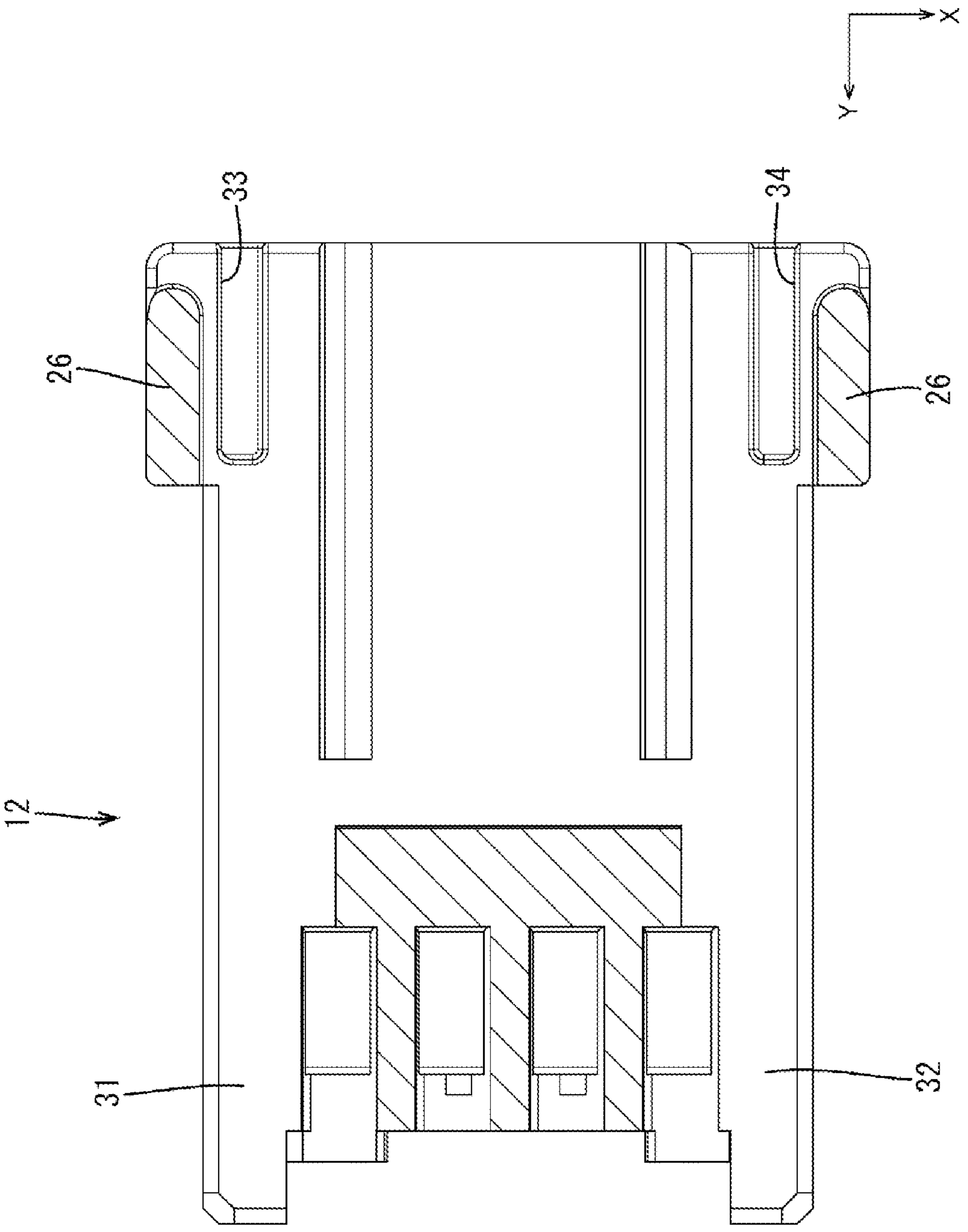
FIG. 6 is a cross-sectional view taken along line VI-VI in FIG. 7.
Figure 7:
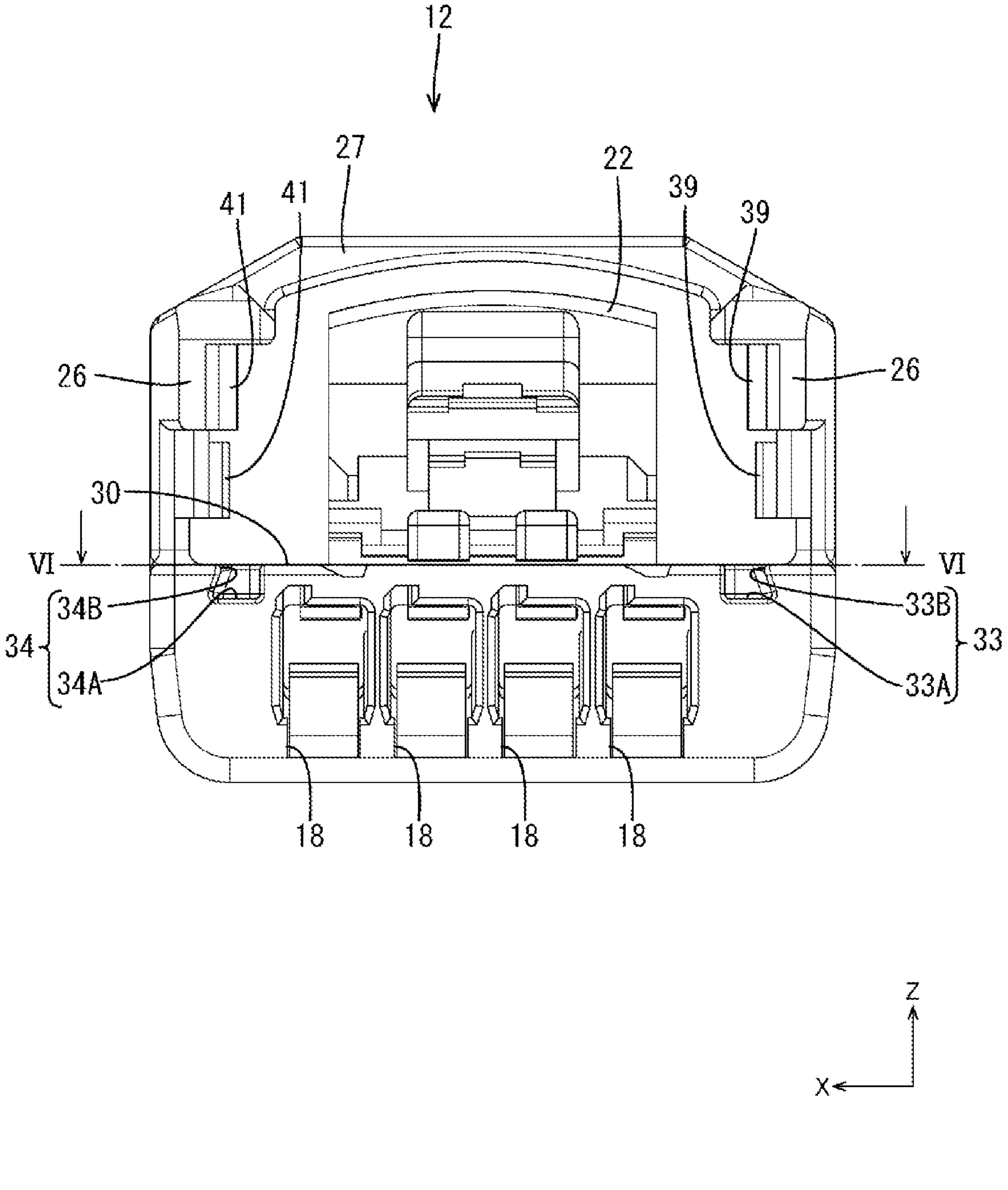
FIG. 7 is a rear view showing a female housing.
Figure 8:
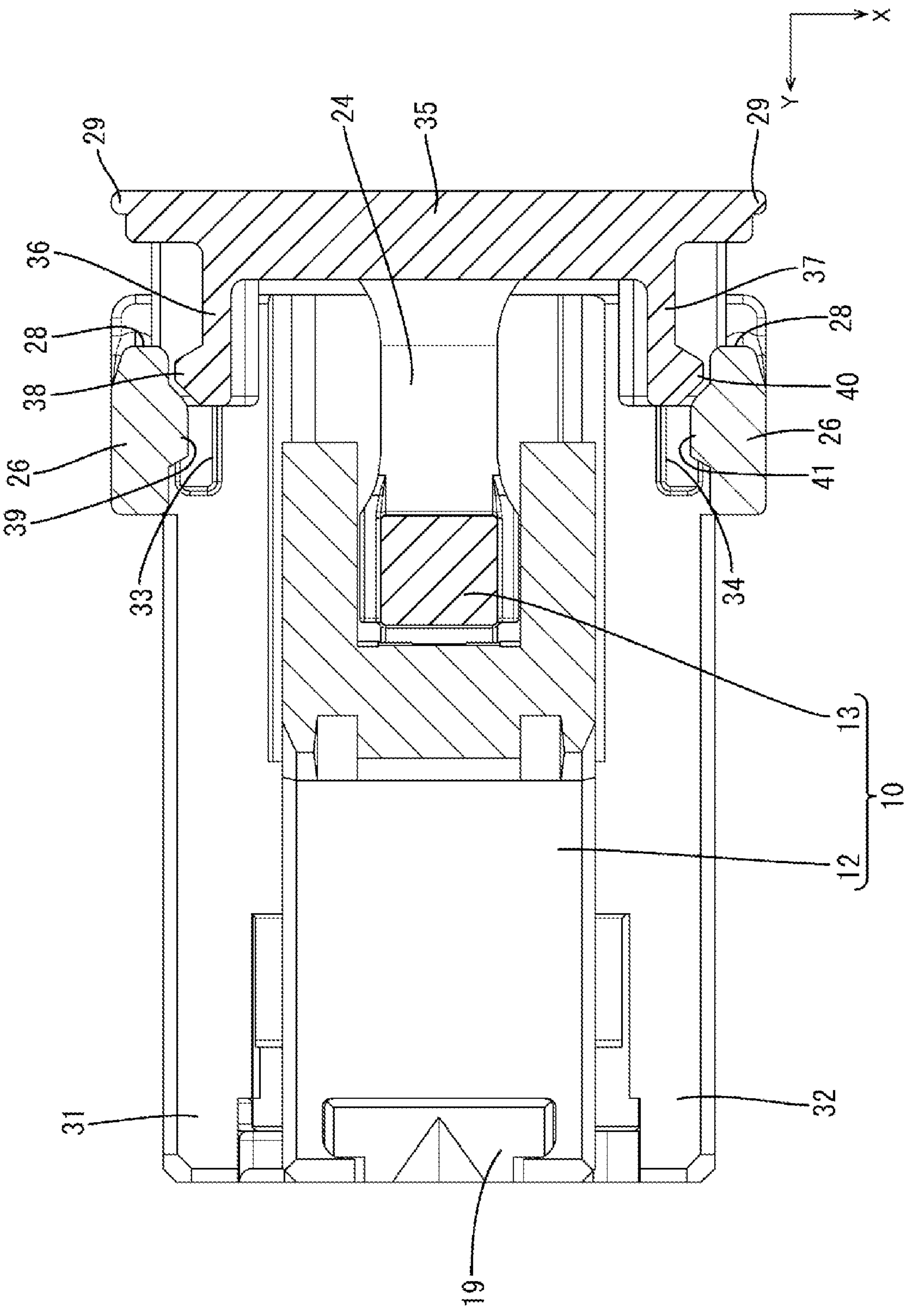
FIG. 8 is a cross-sectional view taken along line VIII-VIII in FIG. 13.

As shown in FIG. 6, a right engagement groove 33 (example of engagement groove) that extends forward from the rear end portion of the female housing 12 is formed in a recessed manner in the upper surface of the right mating rib 31. As shown in FIG. 7, the width dimension of a bottom surface 33A of the right engagement groove 33 is formed larger than the width dimension of an opening 33B of the right engagement groove 33 in the left-right direction. In other words, the right engagement groove 33 has a substantially trapezoidal cross-sectional shape in which the width dimension of the lower base is formed larger than the width dimension of the upper base in the left-right direction. The bottom surface of the right engagement groove 33 is formed parallel to the upper surface of the female housing 12. The left lateral surface of the right engagement groove 33 is formed orthogonal to the upper surface of the female housing 12. The right lateral surface of the right engagement groove 33 is formed to slightly overhang the bottom surface thereof to the left.

As shown in FIG. 6, a left engagement groove 34 (example of engagement groove) that extends forward from the rear end portion of the female housing 12 is formed in a recessed manner in the upper surface of the left mating rib 32. As shown in FIG. 7, the width dimension of a bottom surface 34A of the left engagement groove 34 is formed larger than the width dimension of an opening 34B of the left engagement groove 34 in the left-right direction. In other words, the left engagement groove 34 has a substantially trapezoidal cross-sectional shape in which the width dimension of the lower base is formed larger than the width dimension of the upper base in the left-right direction. The bottom surface of the left engagement groove 34 is formed parallel to the upper surface of the female housing 12. The right lateral surface of the left engagement groove 34 is formed orthogonal to the upper surface of the female housing 12. The left lateral surface of the left engagement groove 34 is formed to slightly overhang the bottom surface to the right.

Detection Member 13

As shown in FIG. 4, the detection member 13 is formed by injection molding an insulating synthetic resin material. The detection member 13 includes a base part 35 that extends in the left-right direction, a right arm part 36 that extends forward from a right end portion of the base part 35, a left arm part 37 that extends forward from a left end portion of the base part 35, and an elastic engagement part 24 that extends forward from near a middle position of the base part 35 in the left-right direction.

As shown in FIG. 5, an operating part 29 for being pinched by the fingers of an operator in order to operate the detection member 13 is provided on each of left and right end parts of the base part 35. The length dimension of the base part 35 in the left-right direction is formed to be substantially the same as the length dimension of the female housing 12 in the left-right direction. Substantially the same includes the case where the length dimension of the base part 35 in the left-right direction and the length dimension of the female housing 12 in the left-right direction are the same, and also includes the case where the length dimensions thereof can be recognized as being substantially the same even if not the same.

Figure 3:
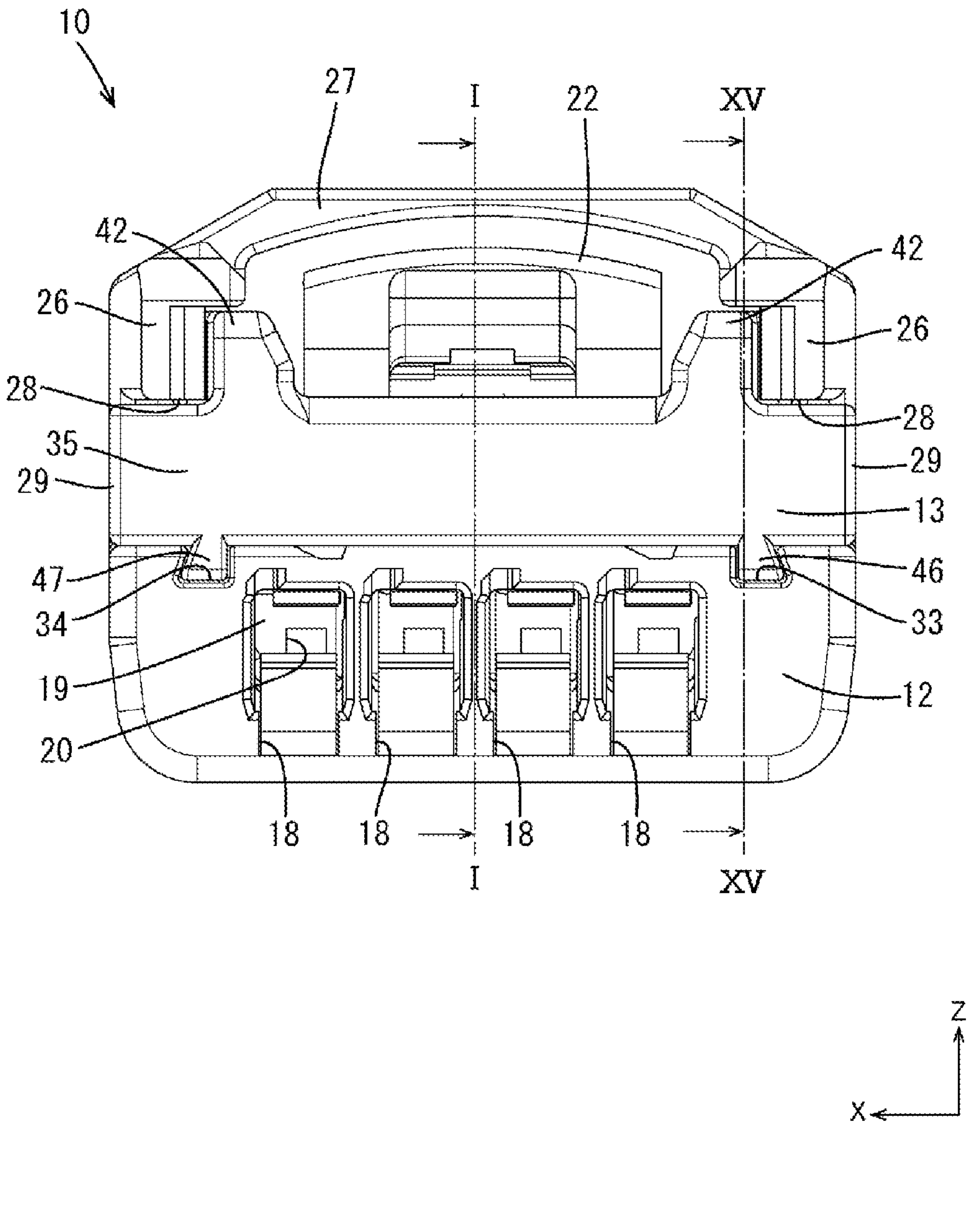
FIG. 3 is a rear view showing the female connector when the detection member is arranged in the full fastening position.

As shown in FIG. 3, the height dimension of the operating parts 29 in the up-down direction is the same as or slightly smaller than the dimension of the housing recessed parts 28 of the female housing 12 in the up-down direction. The operating parts 29 are thereby configured to be housed inside the housing recessed parts 28.

As shown in FIG. 4, the right arm part 36 and the left arm part 37 are formed in a plate shape that is flattened in the left-right direction. The length dimensions of the right arm part 36 and the left arm part 37 protruding forward from the base part 35 are set the same on the left and right. The length dimension of the elastic engagement part 24 protruding forward from the base part 35 is set larger than the protruding length dimension of the right arm part 36 and the left arm part 37.

As shown in FIG. 5, a right engagement receiving part 38 that protrudes rightward is provided on a front end portion of the right arm part 36. The right engagement receiving part 38 is configured to engage a right engagement part 39 formed on a left lateral surface of the standing wall 26 formed on the right side. Also, a left engagement receiving part 40 that protrudes leftward is provided on a front end portion of the left arm part 37. The left engagement receiving part 40 is configured to engage a left engagement part 41 formed on a right lateral surface of the standing wall 26 formed on the left side. Due to the right engagement receiving part 38 engaging the right engagement part 39 and the left engagement receiving part 40 engaging the left engagement part 41, the detection member 13 is configured to be held in a temporary fastening position (see FIG. 8) and the full fastening position (see FIG. 5) with respect to the female housing 12.

As shown in FIG. 3, an upper end portion of the right arm part 36 and an upper end portion of the left arm part 37 are located downward of the protective part 27 of the female housing 12, when the detection member 13 is held in the full fastening position with respect to the female housing 12. The upper end portion of the right arm part 36 and the upper end portion of the left arm part 37 serve as support parts 42 that support the protective part 27 by abutting against the protective part 27 from below when the protective part 27 receives a force from above.

As shown in FIG. 1, the elastic engagement part 24 is formed to extend forward in a slightly obliquely upward manner. The elastic engagement part 24 is formed in an elongated plate shape and is elastically deformable in the up-down direction.

As shown in FIG. 1, a front stopping engagement part 43 that engages a lower end portion of the locking part 17 of the locking arm 21 from the rear is provided on a front end portion of the elastic engagement part 24. The front stopping engagement part 43 is formed in a recessed shape notched rearwardly. A position securing engagement part 25 that engages an inner wall of the engaging recessed part 23 of the locking arm 21 from below is formed upward of the front stopping engagement part 43 (see FIG. 1). The position securing engagement part 25 is formed to follow the shape of the inner wall of the engaging recessed part 23. Note that the position securing engagement part 25 being formed to follow the shape of the inner wall of the engaging recessed part 23 includes the case where the shape of the position securing engagement 25 is formed to conform to the shape of the inner wall of the engaging recessed part 23, and also includes the case where the shape of the position securing engagement 25 can be recognized as generally conforming to the shape of the inner wall of the engaging recessed part 23 even if not conforming thereto.

Figure 9:
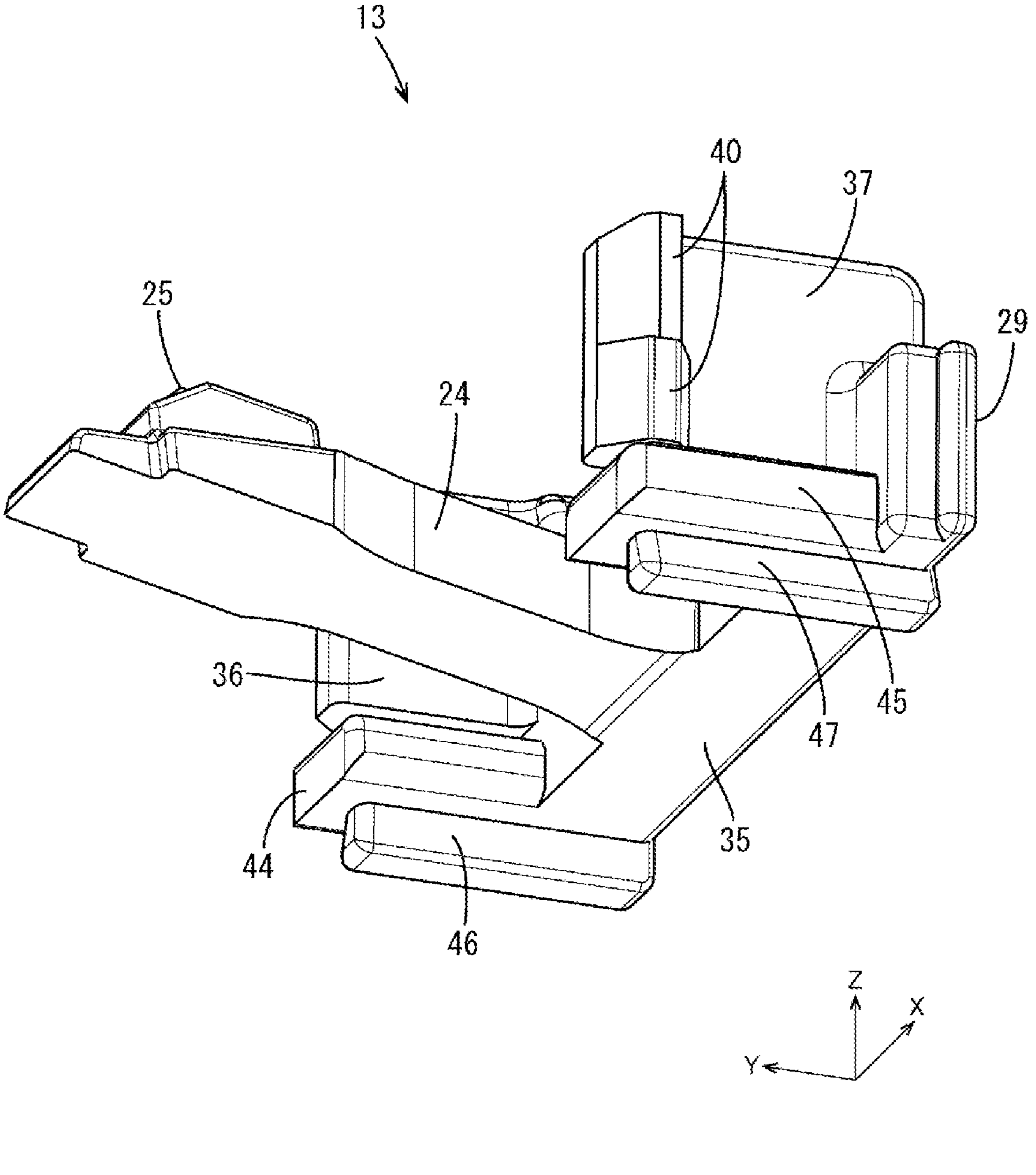
FIG. 9 is a perspective view from below showing the detection member.

As shown in FIG. 9, a right extension part 44 (example of extension part) that extends forward is provided on the base part 35 at a position downward of the right arm part 36. Also, a left extension part 45 (example of extension part) that extends forward is provided on the base part 35 at a position downward of the left arm part 37. The right extension part 44 and the left extension part 45 have a plate shape that is flattened in the up-down direction. The length dimensions of the right extension part 44 and the left extension part 45 protruding forward from the base part 35 are set the same on the left and right.

Figure 10:
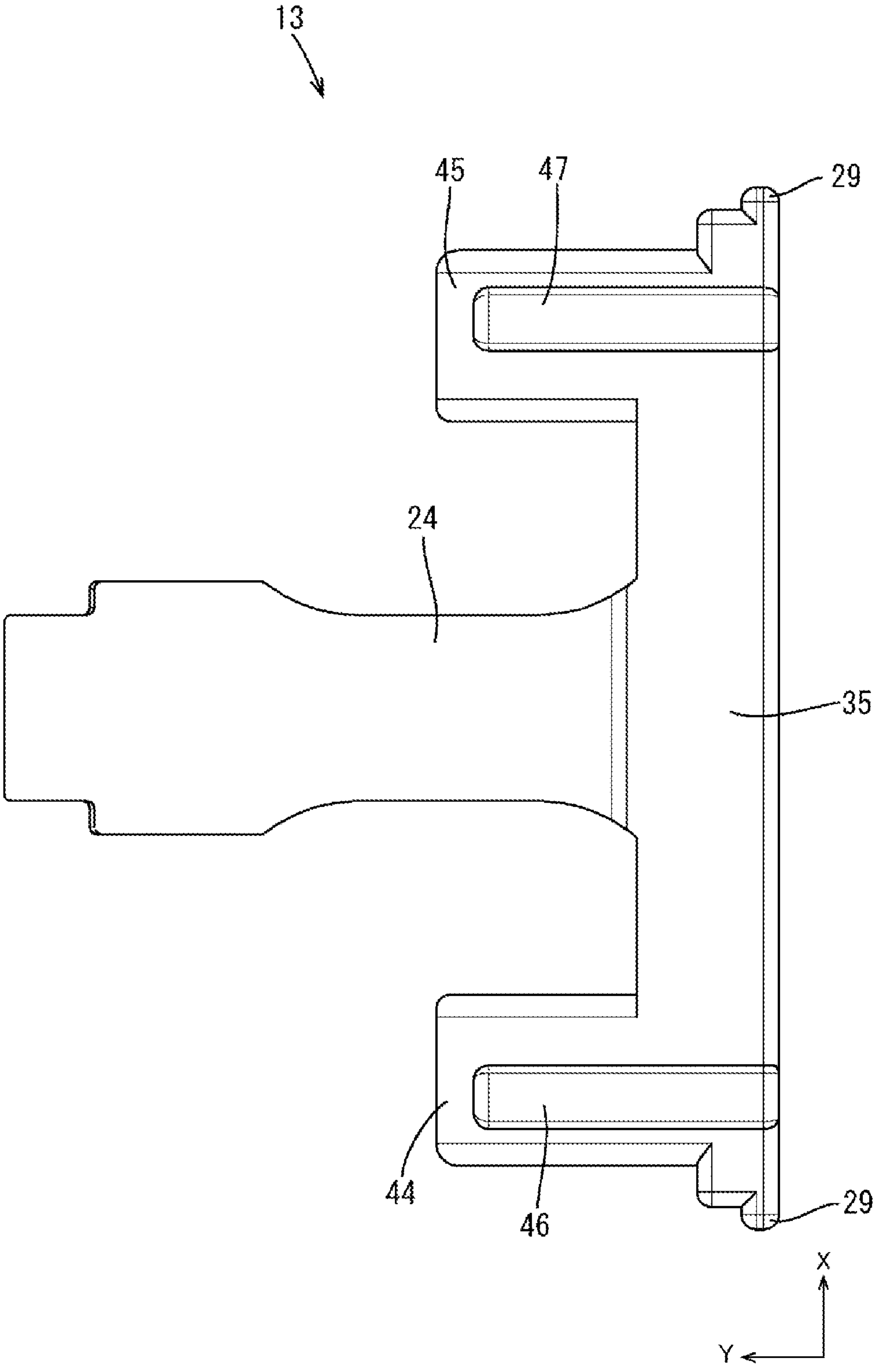
FIG. 10 is a bottom view showing the detection member.

As shown in FIG. 10, a right protrusion 46 (example of protrusion) that protrudes downward is formed to extend in the front-rear direction on a lower surface of the right extension part 44. A front end portion of the right protrusion 46 is located slightly rearward of a front end portion of the right extension part 44.

As shown in FIG. 3, the right protrusion 46 has a substantially trapezoidal cross-sectional shape that follows the cross-sectional shape of the right engagement groove 33. The outer shape of the right protrusion 46 is formed to be the same as or slightly smaller than the inner shape of the right engagement groove 33. The right protrusion 46 is thereby configured to enter the right engagement groove 33 from the rear.

As shown in FIG. 10, a left protrusion 47 (example of protrusion) that protrudes downward is formed to extend in the front-rear direction on a lower surface of the left extension part 45. A front end portion of the left protrusion 47 is located slightly rearward of a front end portion of the left extension part 45.

As shown in FIG. 3, the left protrusion 47 has a substantially trapezoidal cross-sectional shape that follows the cross-sectional shape of the left engagement groove 34. The outer shape of the left protrusion 47 is formed to be the same as or slightly smaller than the inner shape of the left engagement groove 34. The left protrusion 47 to thereby configured to enter the left engagement groove 34 from the rear.

Connector Assembly Process

Next, an example of the process of assembling the male connector 11 to the female connector 10 will be described. The assembly process of the female connector 10 and the male connector 11 is not limited to the following description.

The female housing 12 is formed in a predetermined shape by injection molding an insulating synthetic resin material. A female terminal is inserted from the rear into each cavity 18 formed in the female housing 12 and held therein.

As shown in FIG. 4, the detection member 13 is assembled inside the detection member housing part 30 of the female housing 12 from the rear as indicated by arrow A. The front end portion of the right protrusion 46 of the detection member 13 enters the right engagement groove 33 of the female housing 12 from the rear, and the front end portion of the left protrusion 47 of the detection member 13 enters the left engagement groove 34 of the female housing 12 from the rear. The detection member 13 is thereby held inside the detection member housing part 30 in the temporary fastening position.

Figure 11:
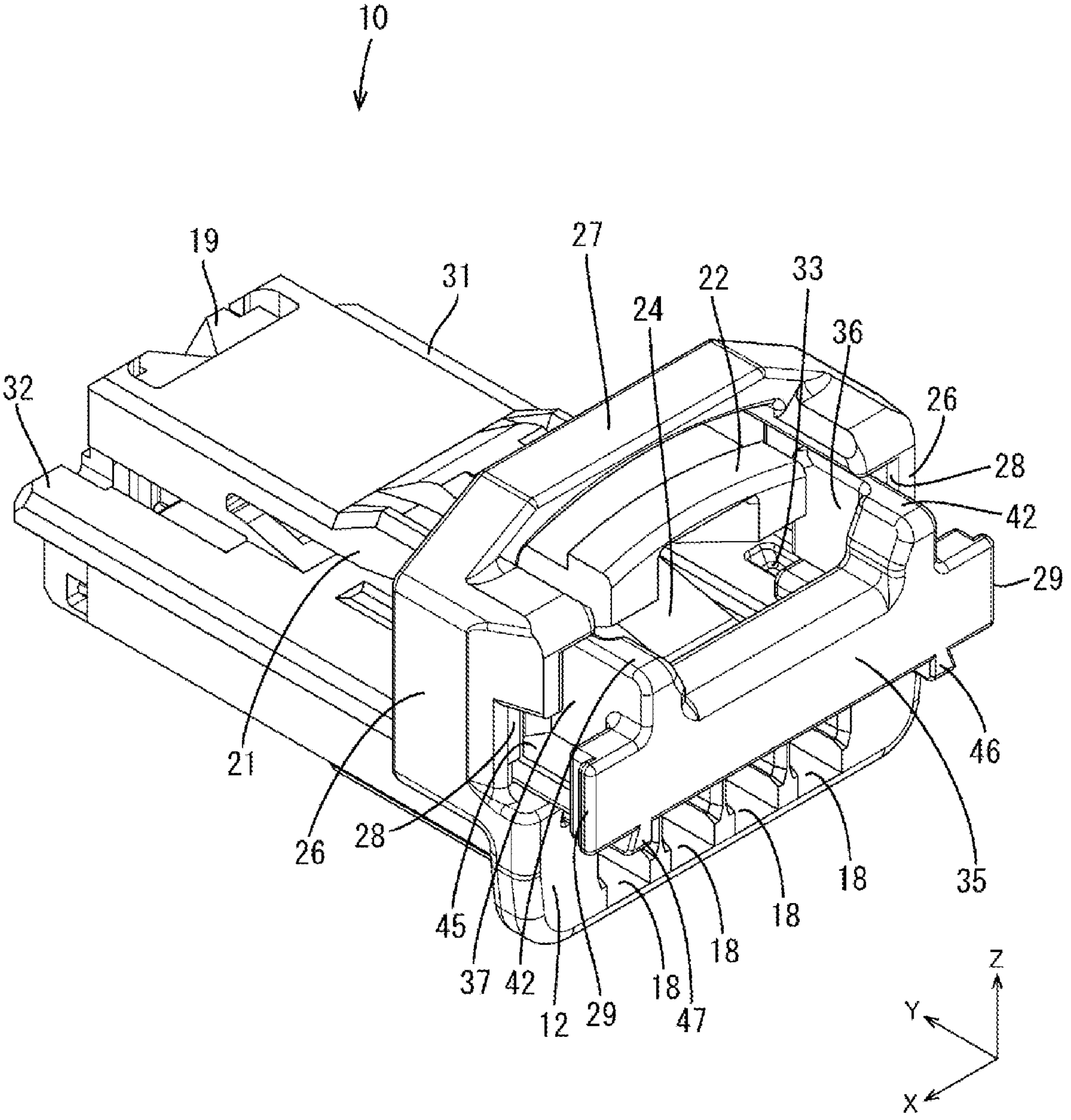
FIG. 11 is a perspective view showing the female connector when the detection member is arranged in a temporary fastening position.
Figure 12:
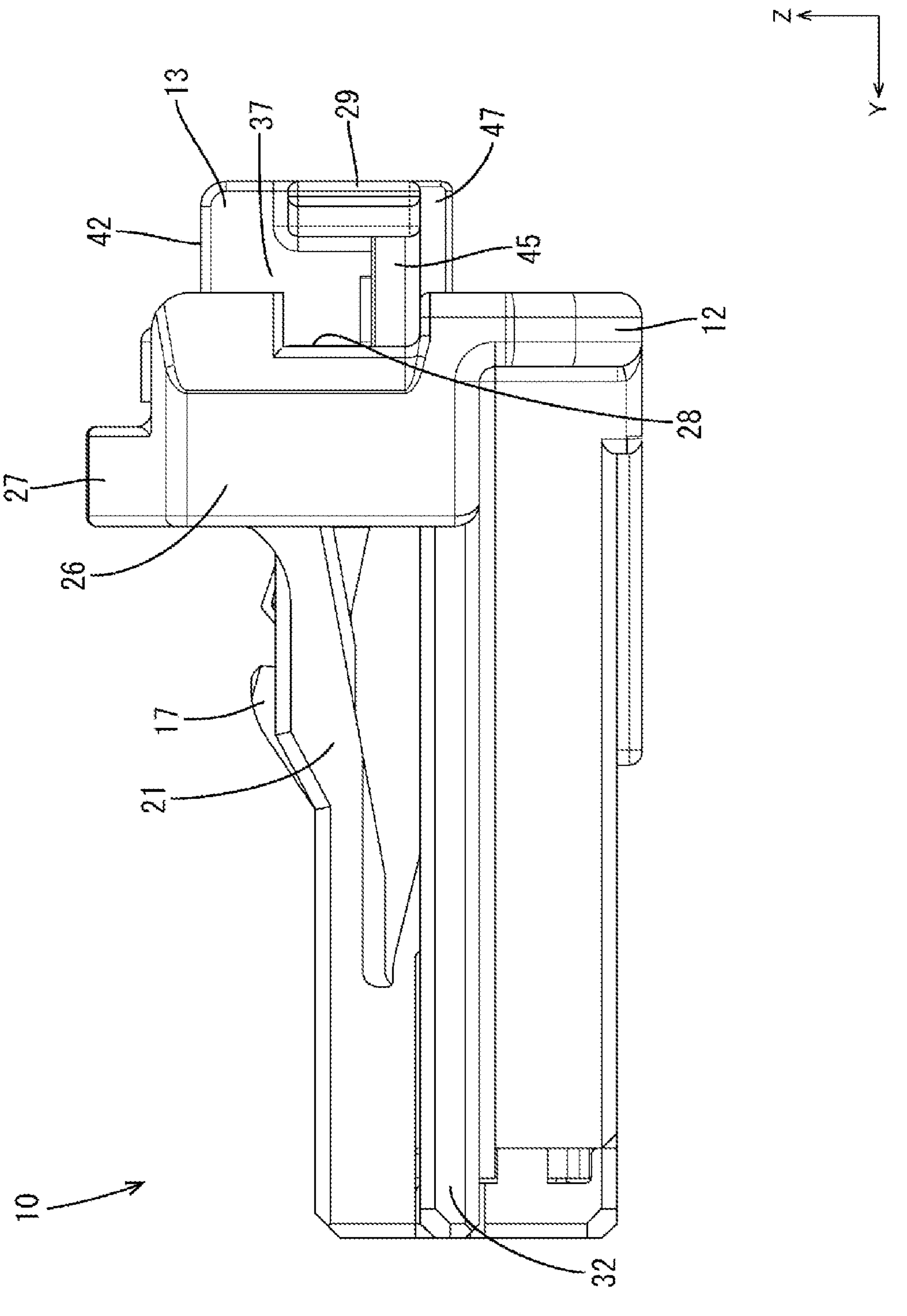
FIG. 12 is a side view showing the female connector when the detection member is arranged in the temporary fastening position.
Figure 13:
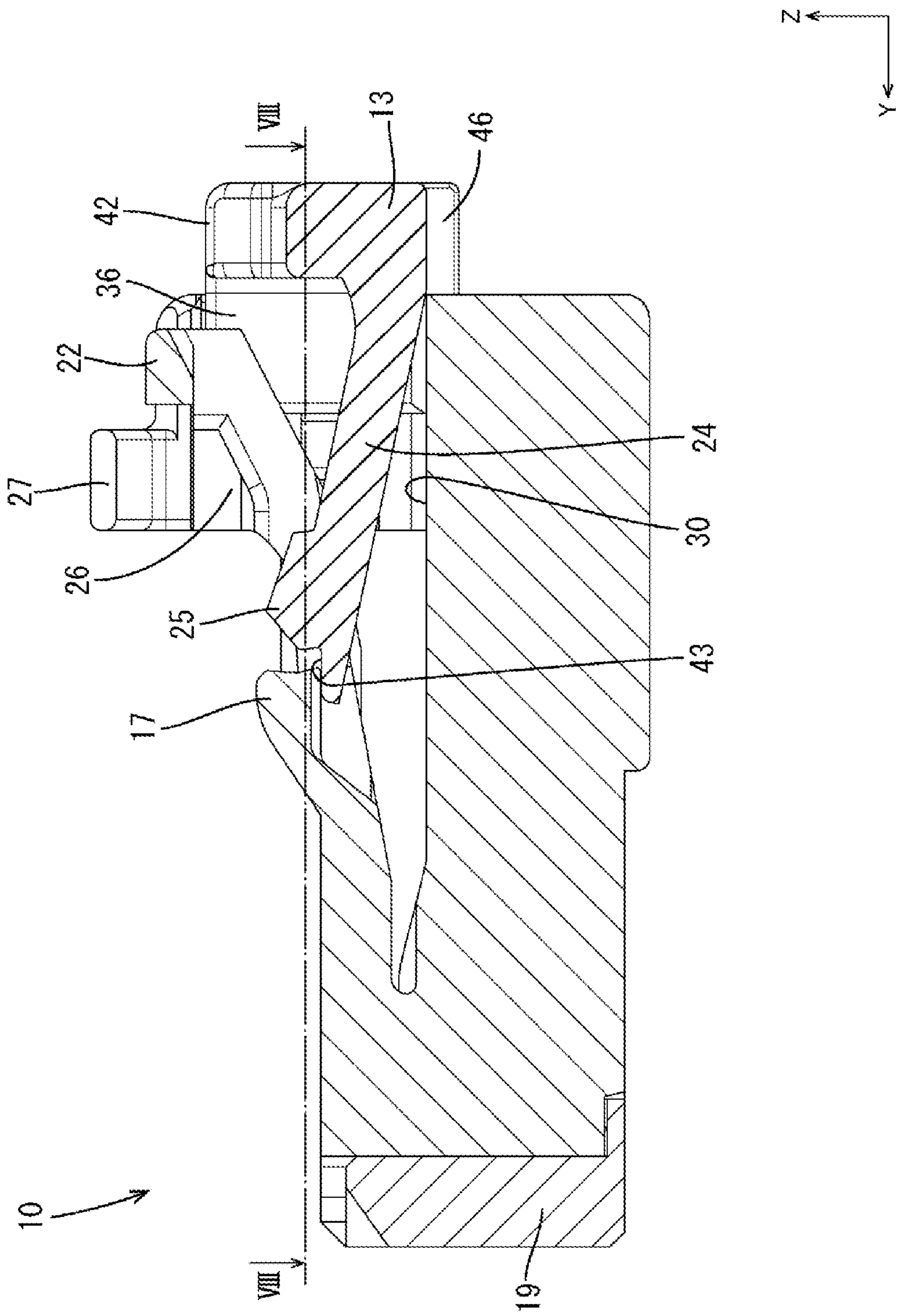
FIG. 13 is a cross-sectional view sectioned at a position corresponding to line I-I in FIG. 3, showing the female connector when the detection member is arranged in the temporary fastening position.
Figure 14:
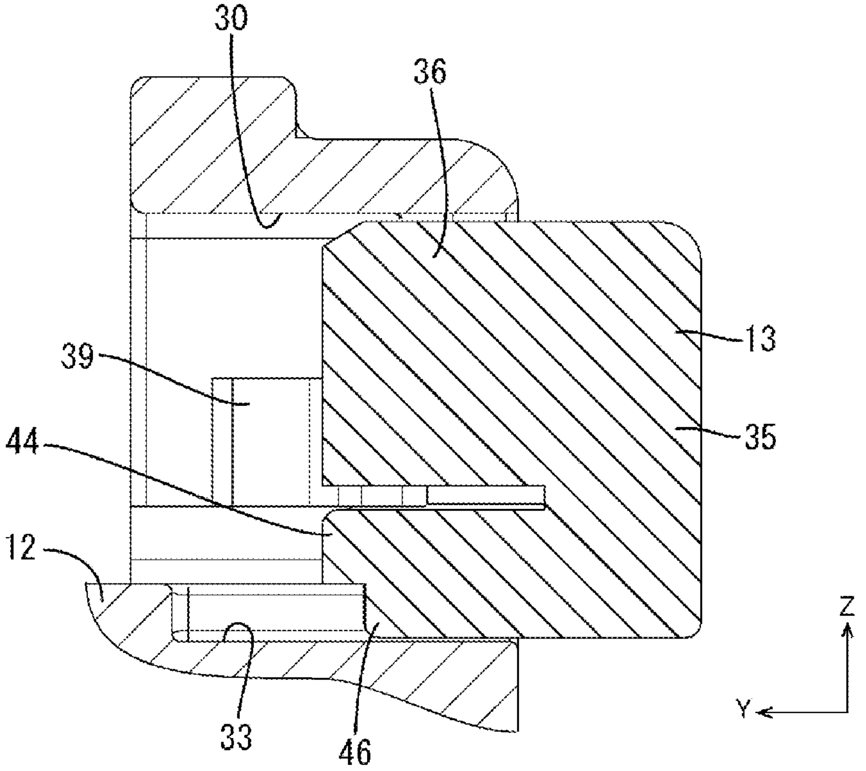
FIG. 14 is a partially enlarged cross-sectional view sectioned at a position corresponding to line XV-XV in FIG. 3, showing the female connector when the detection member is arranged in the temporary fastening position.

As shown in FIGS. 11 and 12, when the detection member 13 is held in the temporary fastening position with respect to the female housing 12, a rear end portion of the detection member 13 protrudes rearward of the rear end portion of the female housing 12. Also, as shown in FIG. 13, the front stopping engagement part 43 of the detection member 13 abuts against the lower end portion of the locking part 17 of the locking arm 21 from the rear.

The male connector 11 is assembled to the female housing 12 from the front, with the hood part 15 open rearward. When the female housing 12 is fitted into the hood part 15, the upper wall of the hood part 15 abuts against the locking arm 21 from above. Downward flexural deformation of the locking arm 21 then occurs, due to the upper wall of the hood part 15 pushing the locking arm 21 downward. Furthermore, when the male connector 11 is pushed rearward, return deformation of the locking arm 21 occurs, and the locking part 17 of the locking arm 21 fits inside the lock receiving part 16 of the hood part 15. The male connector 11 and the female connector 10 are thereby held in a retained state.

Figure 15:
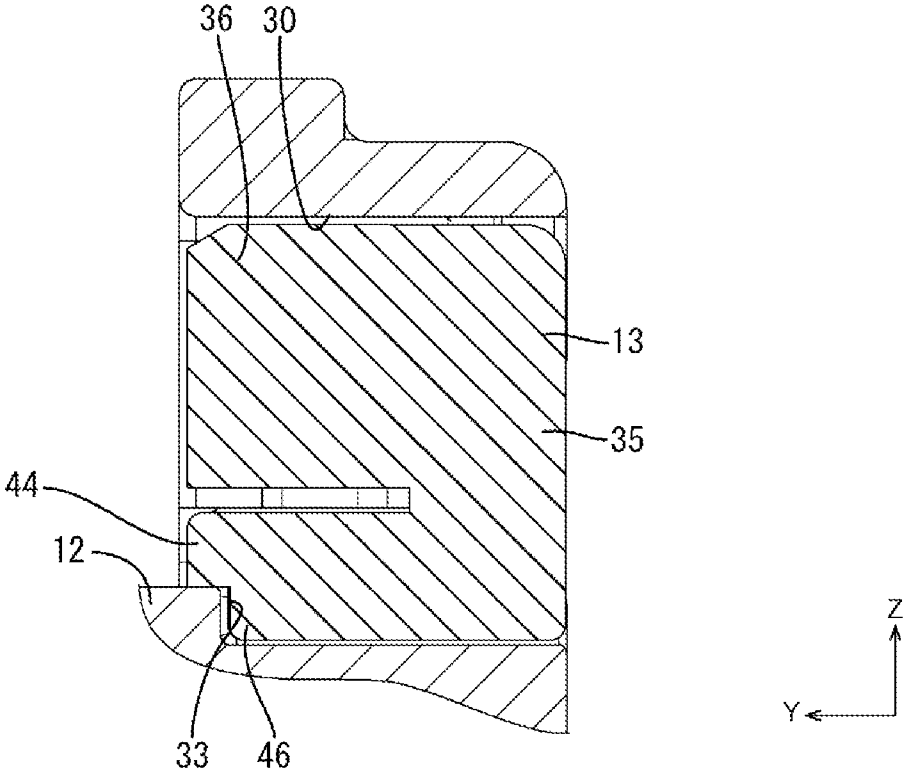
FIG. 15 is a partially enlarged cross-sectional view in which part of the cross-section taken along line XV-XV line in FIG. 3 is enlarged.

Next, due to the base part 35 of the detection member 13 being pushed from the rear, the detection member 13 is moved forward from the temporary fastening position (see FIG. 14) toward the full fastening position (see FIG. 15). At this time, due to the right protrusion 46 and the left protrusion 47 respectively entering the right engagement groove 33 and the left engagement groove 34 and being guided in the front-rear direction, the detection member 13 smoothly move from the temporary fastening position to the full fastening position.

Furthermore, when the detection member 13 is pushed forward, the detection member 13 is held in the full fastening position. Then, as shown in FIG. 1, the position securing engagement part 25 of the elastic engagement part 24 of the detection member 13 abuts against the inner wall of the engaging recessed part 23 of the locking arm 21 from below. Because downward flexural deformation of the locking arm 21 is thereby suppressed, the mating position of the male connector 11 and the female connector 10 is secured.

Operation and Effect of Embodiment 1

Next, the operation and effect of Embodiment 1 will be described. Embodiment 1 includes the female housing 12 configured to mate with the male housing 14 in the front-rear direction, and the detection member 13 attached to the female housing 12 and configured to move between the temporary fastening position and the full fastening position after mating of the housing of the female housing 12 with the male housing 14, the female housing 12 having the elastically deformable locking arm 21 having the locking part 17 configured to be fastened onto the lock receiving part 16 provided on the male housing 14, the detection member 13 having the position securing engagement part 25 configured to enter the flexural space of the locking arm 21 when the locking part 17 and the lock receiving part 16 are fastened together and restrict flexing of the locking arm 21, the detection member 13 being arranged to overlap the female housing 12 from above and protruding rearward in the mating direction from the female housing 12 when arranged in the temporary fastening position, the female housing 12 having the cavities 18 each housing a female terminal, the right engagement groove 33 and the left engagement groove 34 that extend in the front-rear direction each being provided in the surface of the female housing 12 facing the detection member 13 at a position lateral to the cavities 18 with respect to the front-rear direction, and the detection member 13 having the right protrusion 46 and the left protrusion 47 protruding toward the female housing 12 and extending in the front-rear direction, and configured to respectively enter the right engagement groove 33 and the left engagement groove 34.

The female connector 10 can be downsized, compared to the case where the right engagement groove 33 and the left engagement groove 34 are provided between the cavities 18 and the detection member 13. Even if an external force acts on the detection member 13 in the temporary fastening position, the external force is received by the right protrusion 46 and the left protrusion 47 and by the female housing 12 via the right engagement groove 33 and the left engagement groove 34, due to the right protrusion 46 entering the right engagement groove 33 and the left protrusion 47 entering the left engagement groove 34, and thus flexing of the detection member 13, detachment of the detection member 13 from the female housing 12 and the like are suppressed.

According to Embodiment 1, the width dimension of the bottom surface 33A of the right engagement groove 33 is formed larger than the width dimension of the opening 33B of the right engagement groove 33, and the width dimension of the bottom surface 34A of the left engagement groove 34 is formed larger than the width dimension of the opening 34B of the left engagement groove 34.

The female housing 12 and the detection member 13 are firmly held, due to the right protrusion 46 entering the right engagement groove 33 in which the width dimension of the bottom surface 33A is formed larger than the width dimension of the opening 33B, and the left protrusion 47 entering the left engagement groove 34 in which the width dimension of the bottom surface 34A is formed larger than the width dimension of the opening 34B, and thus flexing of the detection member 13, detachment of the detection member 13 from the female housing 12 and the like are further suppressed.

According to Embodiment 1, the detection member 13 has the right extension part 44 and the left extension part 45 that extend forward, the right protrusion 46 is formed on the surface of the right extension part 44 opposing the female housing 12, the left protrusion 47 is formed on the surface of the left extension part 45 opposing the female housing 12, the front end portion of the right protrusion 46 is located rearward of the front end portion of the right extension part 44, and the front end portion of the left protrusion 47 is located rearward of the front end portion of the right extension part 45.

The front end portion of the right protrusion 46 is protected by the front end portion of the right extension part 44, and the front end portion of the left protrusion 47 is protected by the front end portion of the left extension part 45, thus enabling impacting of foreign objects with the front end portion of the right protrusion 46 and the front end portion of the left protrusion 47 to be suppressed.

According to Embodiment 1, the operating parts 29 for an operator to operate the detection member 13 are provided on each of the lateral end portions of the detection member 13 with respect to the front-rear direction, and the housing recessed parts 28 configured to house the operating parts 29 when the detection member 13 has moved to the full fastening position are provided in a forward recessed manner at positions of the female housing 12 corresponding to the operating parts 29.

Operation of the detection member 13 is facilitated, due to the operating parts 29 being provided. The operating parts 29 are housed inside the housing recessed parts 28, and thus protrusion of the operating parts 29 outside the female housing 12 is suppressed when the detection member 13 has moved to the full fastening position. The female connector 10 can thereby be downsized as a whole.

According to Embodiment 1, the standing walls 26 extending upward in the stacking direction from the lateral end portions of the female housing 12 with respect to the mating direction and the protective part 27 provided to bridge between the distal end portions of the standing walls 26 upward of the locking arm 21 are formed on the female housing 12, and the detection member 13 has the support parts 42 that are provided at positions downward of the protective part 27 in the stacking direction and abut against the protective part 27 from below when the protective part 27 receives a force from above in the stacking direction.

The protective part 27 is supported from below by the support parts 42, and thus excessive deformation of the protective part 27 is suppressed. The locking arm 21 can thereby be further protected.

According to Embodiment 1, the female housing 12 includes the right mating rib 31 and the left mating rib 32 protruding laterally on respective sides thereof with respect to the front-rear direction and extending in the mating direction, the right mating rib 31 and the left mating rib 32 abut against the male housing 14 when the female housing 12 and the male housing 14 are mated together in an improper manner, and allow mating of the female housing 12 and the male housing 14 when the female housing 12 and the male housing 14 are mated together in a proper manner, and the right engagement groove 33 and the left engagement groove 34 are respectively provided in the right mating rib 31 and the left mating rib 32.

The right engagement groove 33 and the left engagement groove 34 are respectively provided in the right mating rib 31 and the left mating rib 32, thus enabling the space of the female housing 12 to be effectively utilized. The female connector 10 can thereby be downsized as a whole.

OTHER EMBODIMENTS (1) The cross-sectional shapes of the right engagement groove 33 and the left engagement groove 34 are not limited to the shapes described in Embodiment 1, and may, for example, be so-called dovetail grooves. Also, the right engagement groove 33 and the left engagement groove 34 are not limited to having a trapezoidal cross-sectional shape, and may be L-shaped or T-shaped in cross-section.
(2) The female housing 12 may have from one to three cavities 18 or may have five or more cavities 18.
(3) The female housing 12 may not have the housing recessed parts 28.
(4) The support parts 42 may be omitted.
(5) The right engagement groove 33 and the left engagement groove 34 may be formed in different portions of the female housing 12 to the right mating rib 31 and the left mating rib 32.

LIST OF REFERENCE NUMERALS

10 Female connector
11 Male connector
12 Female housing
13 Detection member
14 Male housing
15 Hood part
16 Lock receiving part
17 Locking part
18 Cavity
19 Front mask
20 Opening
21 Locking arm
22 Operating part
23 Engaging recessed part
24 Elastic engagement part
25 Position securing engagement part
26 Standing wall
27 Protective part
28 Housing recessed part
29 Operating part
30 Detection member housing part
31 Right mating rib (mating rib)
32 Left mating rib (mating rib)
33 Right engagement groove
33A Bottom surface
33B Opening
34 Left engagement groove
34A Bottom surface
34B Opening
35 Base part
36 Right arm part
37 Left arm part
38 Right engagement receiving section
39 Right engagement part
40 Left engagement receiving part
41 Left engagement part
42 Support part
43 Front stopping engagement part
44 Right extension part (extension part)
45 Left extension part (extension part)
46 Right protrusion (protrusion)
47 Left protrusion (protrusion)

What is claimed is:

1. A connector comprising:
a housing configured to mate with a mating housing in a mating direction; and
a detection member attached to the housing and configured to move between a temporary fastening position and a full fastening position after mating of the housing with the mating housing, wherein the housing includes an elastically deformable locking arm having a locking portion configured to fasten onto a lock receiving portion provided on the mating housing, the detection member includes a position securing engagement portion configured to enter a flexural space of the locking arm and restrict flexing of the locking arm when the locking portion and the lock receiving portion are fastened together, the detection member is arranged to overlap the housing in a stacking direction intersecting the mating direction, and protrudes rearward in the mating direction from the housing when arranged in the temporary fastening position, the housing includes a cavity housing a terminal, an engagement groove extending in the mating direction is provided in a surface of the housing facing the detection member at a position lateral to the cavity with respect to the mating direction, the detection member includes a protrusion protruding toward the housing and extending in the mating direction and configured to enter the engagement groove, an engaging recessed portion recessed in a direction away from the housing is formed in the locking portion on a side opposing the housing, the position securing engagement portion is formed to follow a shape of an inner wall of the engaging recessed portion, and flexural deformation of the locking arm is suppressed by the position securing engagement portion abutting against the inner wall of the engaging recessed portion in a state where the detection member is in the full fastening position.

2. The connector according to claim 1, wherein a width dimension of a bottom surface of the engagement groove is set larger than a width dimension of an opening of the engagement groove, and the protrusion has a cross-sectional shape following a cross-sectional shape of the engagement groove.

3. The connector according to claim 1, wherein the detection member includes an extension portion extending forward in the mating direction, and the protrusion is formed on a surface of the extension portion facing the housing, and a front end portion of the protrusion is located rearward of a front end portion of the extension portion in the mating direction.

4. The connector according to claim 1, wherein an operating portion for an operator to operate the detection member is provided on each of lateral end portions of the detection member with respect to the mating direction, and housing recessed portions configured to house the operating portions when the detection member has moved to the full fastening position are provided at positions of the housing corresponding to the operating portions.

5. The connector according to claim 1, wherein a standing wall extending upward in the stacking direction from each of lateral end portions of the housing with respect to the mating direction and a protective portion provided upward of the locking arm to bridge between distal ends of the standing walls are formed on the housing, and the detection member includes a support portion provided at a position downward of the protective portion in the stacking direction and configured to abut against the protective portion from below when the protective portion receives a force from above in the stacking direction.

6. The connector according to claim 1, wherein the housing includes a mating rib protruding laterally on each side thereof with respect to the mating direction and extending in the mating direction, the mating ribs are configured to abut against the mating housing when the housing and the mating housing are mated together in an improper manner, and to allow mating of the housing and the mating housing when the housing and the mating housing are mated together in a proper manner, and the engagement groove is provided in each of the mating ribs.

7. The connector according to claim 1, wherein in the state where the detection member is in the full fastening position, the locking portion is disposed between the position securing engagement portion and a hood portion of the mating housing having a rear end portion provided with the lock receiving portion.

8. The connector according to claim 1, wherein a pair of operating portions are provided on rear end portions of the detection member with respect to the mating direction, a pair of housing recessed portions configured to house the operating portions when the detection member has moved to the full fastening position are provided at positions of the housing corresponding to the operating portions, a pair of standing walls extending upward in the stacking direction from each of lateral end portions of the housing with respect to the mating direction are provided, and the housing recessed portions are formed in the standing walls.

* * * * *